US006527277B2

United States Patent
Hegmann

(10) Patent No.: US 6,527,277 B2
(45) Date of Patent: Mar. 4, 2003

(54) FLAT GASKET

(75) Inventor: Oliver Hegmann, Ginsheim (DE)

(73) Assignee: Elring Klinger AG, Dettingen (DE)

( * ) Notice: Subject to any disclaimer, the term of this patent is extended or adjusted under 35 U.S.C. 154(b) by 0 days.

(21) Appl. No.: 09/860,137

(22) Filed: May 17, 2001

(65) Prior Publication Data
US 2001/0045707 A1 Nov. 29, 2001

(30) Foreign Application Priority Data

May 23, 2000 (DE) .......................... 100 25 400
Sep. 20, 2000 (DE) .......................... 100 46 505

(51) Int. Cl.$^7$ ................................ F02F 11/00
(52) U.S. Cl. .................. 277/596; 277/591; 277/592; 277/594
(58) Field of Search ................ 277/591, 592, 277/594, 596

(56) References Cited

U.S. PATENT DOCUMENTS

| 2,513,178 | A | * | 6/1950 | Jackson ................. 277/611 |
| 2,727,793 | A | * | 12/1955 | Nenzel ................. 182/110 |
| 3,957,279 | A | * | 5/1976 | Belter ................. 277/594 |
| 4,140,323 | A | * | 2/1979 | Jacobs ................. 215/341 |
| 5,033,189 | A | * | 7/1991 | Desverchere et al. ....... 277/594 |

FOREIGN PATENT DOCUMENTS

| DE | 43 37 758 C1 | 1/1995 |
| EP | 0 059 777 A1 | 9/1982 |
| EP | 0 701 051 B1 | 3/1996 |
| JP | 4-82345 | 7/1992 |

OTHER PUBLICATIONS

Drawing Sheet No. 003867, Elving Klinger–GMBH, Dec. 1997.

* cited by examiner

Primary Examiner—Lloyd A. Gall
Assistant Examiner—Enoch Peavey

(57) ABSTRACT

Flat gasket with a gasket plate formed by a sheet metal layer for sealing a sealing gap between sealing surfaces of machine components, the gasket plate being provided with an elastomeric sealing element in an area in which the component sealing surfaces lead to a locally varying sealing surface pressure; in order that the sealing element can already be applied by the gasket manufacturer and will not be subjected to the danger of damage during installation of the gasket, a sealing element formed from a material curable in situ is applied to a first main surface of the sheet metal layer, and the sheet metal layer is provided with a cutout for passage of the curable sealing element material therethrough so that the sealing element material passes through this cutout and comes to rest against the adjacent component sealing surface only after installation of the gasket.

11 Claims, 2 Drawing Sheets

FLAT GASKET

The invention relates to a flat gasket for sealing a sealing gap between sealing surfaces of machine components which can be pressed against the flat gasket which comprises a gasket plate formed by a sheet metal layer.

The sheet metal layer forming the two main surfaces of the gasket plate of such flat gaskets is usually provided with beads at particularly critical places with respect to the sealing function where an increased sealing surface pressure is to be generated between the flat gasket and the sealing surfaces of the machine components which are to be sealed off from one another. However, such beads have proven inadequate at places where the machine component sealing surfaces, between which the flat gasket is clamped, are uneven, for example, have steps, as is the case when with a machine component sealing surface resting against the flat gasket there are several, for example, two, sealing surface areas which are formed by several separate machine components resting against one another in the area of this step, i.e., forming a joint—at such joints manufacturing and/or assembly tolerances can result in a step in the said sealing surface.

This problem typically occurs with flat gaskets in the form of cylinder head gaskets for reciprocating internal combustion engines with an, in particular, multipart chain case which is likewise to be sealed off by the cylinder head gasket, because in this case the two machine component sealing surfaces between which the cylinder head gasket is clamped, are formed, on the one hand, by the cylinder head and a chain case top part, and, on the other hand, by the engine block or crankcase and a chain case bottom part—with such an engine construction there is both a joint between the cylinder head and the chain case top part and a joint between the engine block and the chain case bottom part. However, the top part of the chain case can also be formed by the cylinder head so that there is no separate chain case top part, or the bottom part of the chain case can be formed by the engine block so that there is no separate chain case bottom part. Nevertheless, a joint still results in the bottom or top one of the sealing surfaces between which the cylinder head gasket is clamped.

Several solutions to the above-described problem caused by joints are to be found in the prior art:

EP-A-0 059 777 discloses a single-layer, metallic flat gasket for a multipart gear housing with a housing top part and a housing bottom part, between which the flat gasket is clamped. The housing top part itself is made up of several parts so that joints result in the sealing surface of the housing top part which has to be pressed against the flat gasket, and these can lead to steps in an area of the sealing surface. For this reason, the flat gasket has an elongate, slot-shaped opening, which extends over all these joints when the gasket is installed and into which a strand-shaped, elastomeric sealing element is placed, which projects on both sides above the two main surfaces of the flat gasket and is made as a prefabricated insert.

Solutions to the above-described problem for cylinder head gaskets which also serve to seal off a chain case are also to be found in the prior art:

DE-C-43 37 758 shows a multilayer, metallic cylinder head gasket in which prefabricated elastomeric sealing elements are inserted, more specifically, at places on the cylinder head gasket which each lie over a joint between engine block and chain case. In a first, four-layered embodiment of this cylinder head gasket, each of the sealing elements has an approximately T-shaped cross section with a sealing portion and a head portion which is thickened in relation to the latter and serves to fix the sealing element in the cylinder head gasket. For this purpose, the two center layers have for each sealing element rectangular, window-like openings lying above one another for receiving the head portion of the respective sealing element, while the one cover or outer layer is closed in the area of the sealing elements and the other cover layer has for each sealing element a rectangular, window-like opening through which the sealing portion of the sealing element engages and which is smaller than the openings of the center layers and the cross section of the head portion. In the unpressed state of the cylinder head gasket, the sealing portions of the sealing elements already project to a considerable extent beyond the cover layer provided with the openings. In a second embodiment of this known cylinder head gasket, which has three layers, all three layers have at the locations of the sealing elements rectangular, window-like openings lying above one another, and the openings of the center layer are somewhat larger than the openings of the cover layers, which are of the same size, so that the sealing elements are held securely against displacements between the cover layers with central areas of increased diameter. In this second embodiment, too, the sealing elements already project beyond the one main surface of the gasket in the unpressed state of the cylinder head gasket.

Finally, EP-B-0 701 051 discloses a multilayer, metallic cylinder head gasket which also serves to seal off a chain case. The gasket plate of this cylinder head gasket has a relatively thick center layer and two relatively thin outer layers, which are each provided with a so-called half bead, which extends around the chain case opening as a bead line closed within itself (in contrast to full beads of approximately U-shaped cross section a half bead has a cross section which corresponds to a step or Z pulled more or less flat). Beside each of the two narrow sides of the chain case opening the center layer has a cutout in the form of an elongate, rectangular window, which extends parallel to the adjacent narrow side of the chain case opening, and a prefabricated, strand-shaped, elastomeric sealing element which is inserted with play in the respective window and projects on both sides over the two main surfaces of the center layer (already prior to installation of the cylinder head gasket, i.e., while it is unpressed). One of the outer layers is closed over the sealing elements, i.e., continuously, while the other cover layer has a large, approximately rectangular window which is larger than the chain case opening and exposes the two sealing elements, i.e., in a plan view of the cylinder head gasket, the two sealing elements lie within this window. EP-B-0 701 051 does not explain how with this known cylinder head gasket the two sealing elements are to be prevented from falling out of the gasket during handling thereof. Furthermore, this known cylinder head gasket is only able to partly solve the problem explained at the outset when in the machine component sealing surfaces to be pressed against the cylinder head gasket, there are joints on both sides of the cylinder head gasket because the chain case is comprised of a chain case top part and a chain case bottom part. Moreover, as will be apparent from the following, this known gasket can also lead to problems when on the side of the outer layer provided with the windows there is a chain case part which is inserted from the side during assembly thereof.

When assembling engines with a chain case comprised of a top part and a bottom part, it has already been attempted to solve the problem set forth at the outset by providing the cylinder head gasket on either side of the chain case opening with a relatively small, oval hole which passes through all layers of the multilayer metallic cylinder head gasket and into which an initially viscous sealant is injected in the course of assembly of the engine, which can be cured to an elastomeric material at elevated temperatures, for example, when the engine is first put into operation. It is, however, obvious that such a procedure when assembling the engine in series production is unsatisfactory for several reasons: Today, vehicle manufacturers tend to delegate as many work steps as possible to their suppliers, and in series production it is also difficult, but at least time-consuming to always inject the amount of sealant necessary for reliable sealing into the said holes.

Furthermore, with the flat gaskets in question there is often also a further problem which can be illustrated well with reference to an engine with a multipart chain case: If, for example, the chain case top part is guided parallel to the plane of the sealing gap which is to be sealed by the cylinder head gasket, there is the risk when assembling the chain case top part that an elastomeric sealing element projecting above the surface contour of the gasket plate will be cut off.

The object underlying the invention was to create a flat gasket with a gasket plate which is formed at least substantially by a sheet metal layer, and which is provided with at least one elastomeric sealing element in a gasket plate area which serves to seal a sealing gap area between sealing surfaces of machine components which can be pressed against the flat gasket and in which the component sealing surfaces result in a locally varying sealing surface pressure at the flat gasket, in order to reliably seal the sealing gap also at places where a step may occur in a machine component sealing surface. The flat gasket is to be of such a kind that the sealing element is already applied by the gasket manufacturer and is not subjected to the danger of being damaged or even cut off when assembling the assembly group comprising the machine components and the flat gasket. In particular, the invention is to create a cylinder head gasket for an engine with a chain case, wherein the chain case comprises a chain case top part and/or a chain case bottom part, which contributes or contribute to the formation of the sealing gap to be sealed by the cylinder head gasket.

This object is accomplished by a flat gasket as defined in claim 1, i.e., by a flat gasket for sealing a sealing gap between sealing surfaces of machine components which are pressable against the flat gasket, the flat gasket comprising a gasket plate formed by a sheet metal layer, the gasket plate being provided with at least one elastomeric sealing element in a gasket plate area serving to seal a sealing gap area in which the component sealing surfaces lead to a locally varying sealing surface pressure at the flat gasket, the sealing element being arranged on a first main surface of the sheet metal layer, and the surface contour of the sheet metal layer defining at the second main surface of the sheet metal layer a plane of the maximum level of the said surface contour parallel to the plane of the gasket plate in the unmounted, unpressed state of the flat gasket. Such a flat gasket according to the invention exhibits the combination of the following features:

(a) the sealing element is in the form of a sealing element formed from a material which is applied to the first main surface of the sheet metal layer and is curable in situ;

(b) the sheet metal layer is provided in the area of the sealing element with a cutout for passage of the curable sealing element material therethrough;

(c) the material of the sealing element is initially capable of undergoing plastic deformation at least at operating temperature of the machine components and the flat gasket such that in the mounted, pressed state of the flat gasket, the sealing element extends through the cutout of the sheet metal layer as far as the component sealing surface adjacent to the second main surface of the sheet metal layer;

(d) the gasket plate and the sealing element are so designed that in the unmounted, unpressed state of the flat gasket, the sealing element extends at the most as far as the said plane of the maximum level.

With a flat gasket wherein the sheet metal layer forming the main surfaces of the gasket plate has in the area or in the vicinity of the sealing element (in a plan view of the flat gasket) for example, a bead which forms in the above-mentioned second main surface of the gasket plate an outwardly projecting step or elevation, the said plane of the maximum level is that plane which extends parallel to the plane of the gasket plate and lies on the bead. The same applies accordingly to other elevations of the surface contour of the aforementioned second main surface of the gasket plate in the area or in the vicinity of the sealing element. In a flat gasket according to the invention, the sealing element is thus protected from the danger of being severed, for example, in the course of assembly of the chain case top part because the sealing element, before the flat gasket is clamped in the sealing gap between the machine components (for example, by tightening the cylinder head screws), does in no way project beyond the said plane of the maximum level on the side of the gasket exposed to the risk of damage, and, consequently, is protected by other gasket parts or by the surface contour of the gasket against damage by a machine component such as a chain case top part or bottom part, which is inserted from the side.

Furthermore, the sealing element can already be mounted by the gasket manufacturer so that when assembling the machine components, no further work need be carried out on the flat gasket itself.

When in the foregoing mention has been made of the fact that the material of the sealing element is to be initially capable of undergoing plastic deformation at least at the operating temperature of the machine components and the flat gasket, the following is to be understood by this: The initially applied, not yet cured material from which the sealing element is formed, should at least also be capable of undergoing plastic deformation and to a certain extent at least until the flat gasket is clamped between the machine components to be sealed off from one another. The material from which the sealing element is formed can already be partially cross-linked prior to installation of the gasket, in order to bring about a certain dimensional stability, without the sealing element thereby losing all plasticity or all ability to flow. The material of the sealing element can then cure fully, for example, at operating temperatures (e.g. of the engine) or at lower temperatures which are elevated with respect to room temperature to the extent that it then only exhibits elastic, but no longer any plastic properties.

The underlying principle of the inventin enables the gasket plate and the sealing element to be so designed that a sealing area of the sealing element, which is sealingly effective when the gasket is mounted, is pressed through the cutout of the sheet metal layer and pressed against that component sealing surface adjacent to the second main surface of the sheet metal layer only by clamping the flat gasket between the machine components. With the gasket not yet mounted, i.e., unpressed, the sealing element can either not yet project into the cutout of the sheet metal layer at all or can engage in this cutout or can even engage through this cutout, but at least not project out of this cutout to the extent that the said sealing area of the sealing element.

The flat gasket according to the invention is thus particularly well suited for an installation situation in which the machine component sealing surfaces lying on both sides of the flat gasket both have steps or similar unevennesses which are difficult to seal off. The cutout of the sheet metal layer can also serve to improve the anchoring of the sealing element on the sheet metal layer.

The gasket according to the invention is also suited for installation situations in which only the component sealing surface adjacent to the first main surface of the sheet metal layer has a step or a similar unevenness: If the material of the sealing element does not yet extend into the cutout of the sheet metal layer or does at least not yet fill out this cutout completely so long as the gasket is not yet installed, as is to be the case in preferred embodiments of the invention, the cutout forms an evasion area for the sealing element material during the procedure of clamping the gasket between the component sealing surfaces (and/or during operation of the machine), which counteracts an excessive squeezing of the sealing element, which may result in leakages.

As will be apparent from the above, the sealing problem with engines having a multipart chain case as explained above can be solved with a flat gasket according to the invention, more specifically, with a gasket as defined in claim 4, wherein the cutout of the sheet metal layer is designed and arranged so as to bridge the joint between a first separate chain case part and the engine component adjacent thereto (the first chain case part can be the chain case top part or the chain case bottom part and the adjacent engine component can be the cylinder head and the engine block, respectively). As the joint problem explained above often exists on both sides of the cylinder head gasket, a cylinder head gasket according to the invention is then so designed that the above-mentioned cutout of the sheet metal layer is designed and arranged so as to bridge the joint between the second separate chain case part and the engine component adjacent to thereto.

In preferred embodiments of a cylinder head gasket according to the invention for engines with a chain case, the sheet metal layer is provided in the area or in the immediate vicinity of its cutout with a bead (full bead, but preferably half bead), which forms on the above-defined, second main surface of the gasket plate a projection rising above the cutout of the sheet metal layer. With such a naturally elastically deformable bead, sealing can be effected with sufficient reliability all around the chain case opening where the engine component sealing surfaces do not have any steps. In addition, or, as an alternative, the bead can protect the sealing element or sealing elements against damage.

The invention will be explained in further detail hereinbelow with reference to a preferred embodiment of a cylinder head gasket according to the invention, which is shown in the appended drawings. In the drawings.

Figure 1:
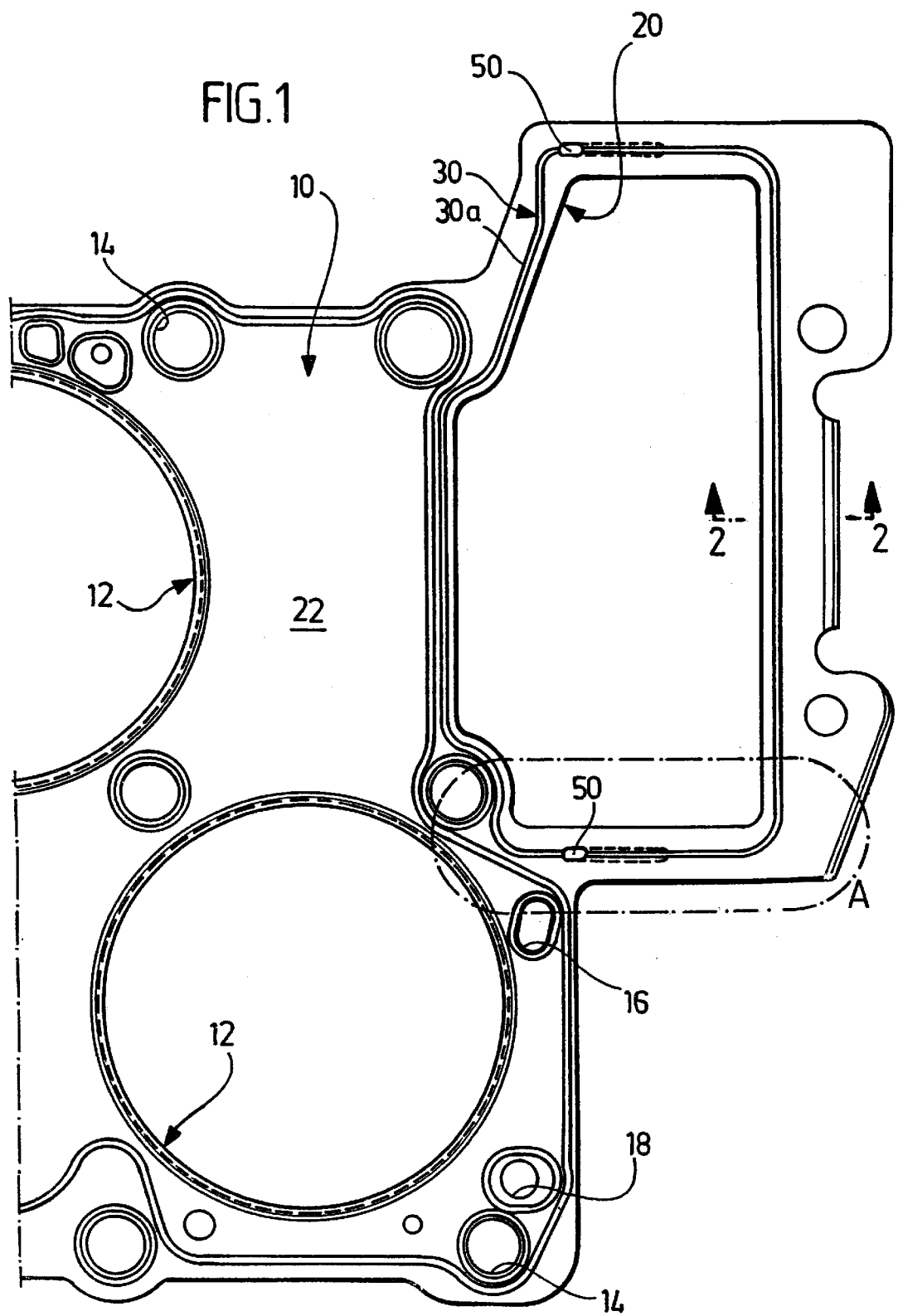
FIG. 1 is a plan view of part of the cylinder head gasket, which comprises two combustion chamber openings and a chain case opening of the gasket.

The cylinder head gasket shown partially in FIG. 1 has a gasket plate generally designated 10, in which a plurality of openings passing through the gasket plate are formed, for example, combustion chamber openings 12, screw holes 14 for passage of cylinder head screws, and water and oil holes 16 and 18, respectively. The cylinder head gasket also contains a chain case opening 20, around which sealing surfaces of a chain case top part and an adjacent cylinder head as well as a chain case bottom part and an adjacent engine block are to be sealed off from one another by the cylinder head gasket.

Figure 2:
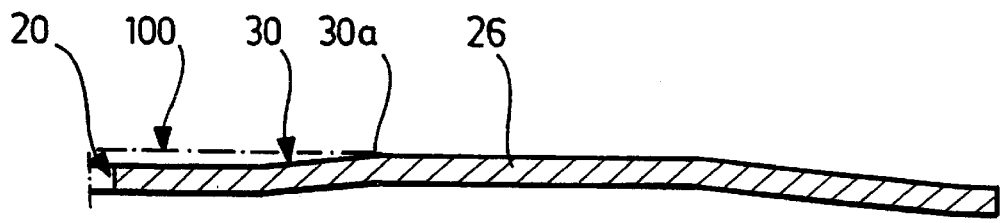
FIG. 2 is a section along line 2—2 in FIG. 1.

As will be apparent, for example, from FIG. 2, the gasket plate 10 comprises a single layer and is essentially formed by a sheet metal layer 26 consisting of sheet steel with elastic properties and being provided with beads.

Around the chain case opening 20 there extends in the sheet metal layer 26 a half bead 30 (see also FIG. 2), which forms a bead line closed within itself and the crest of which is designated 30a.

Figure 3:
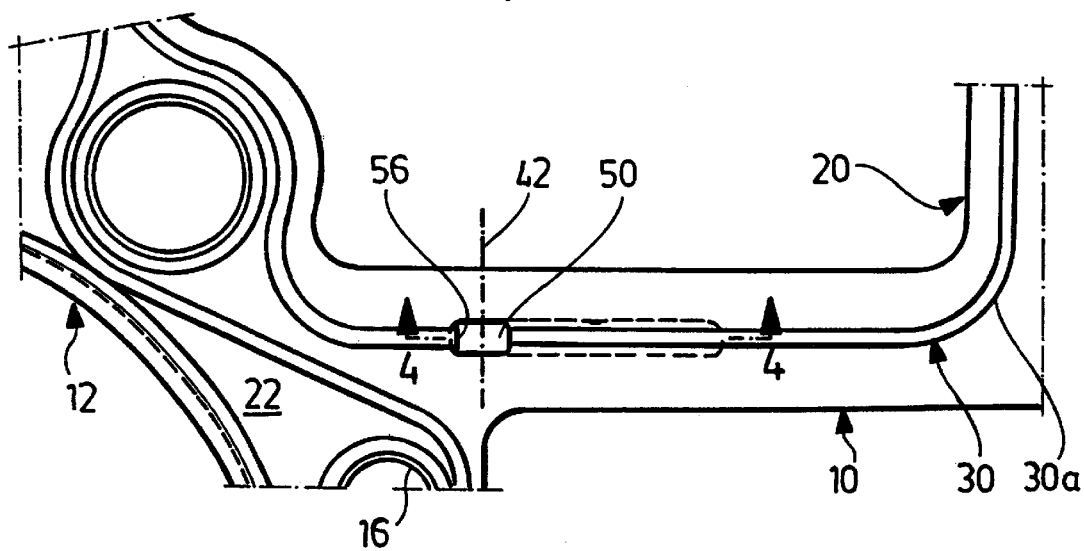
FIG. 3 is the area "A" indicated in FIG. 1 on a larger scale.
Figure 4:
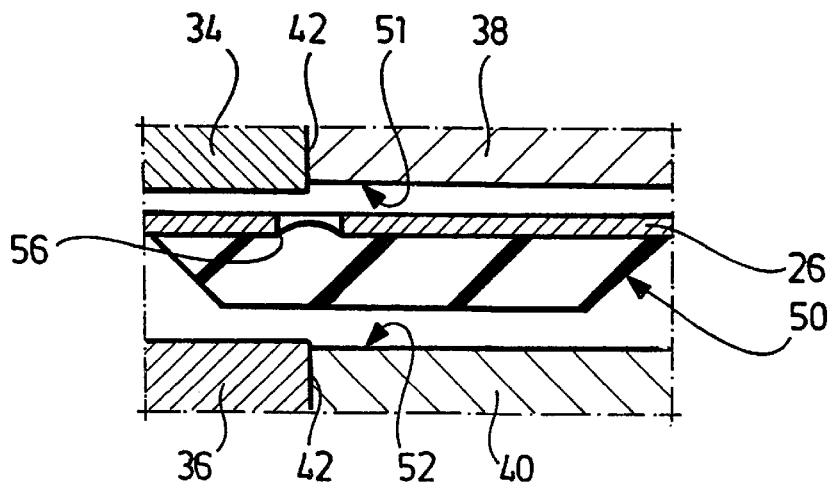
FIG. 4 is a section along line 4—4 in FIG. 3, with parts of an engine block, a cylinder head, a chain case top part and a chain case bottom part of an engine belonging to the gasket also indicated in FIG. 4.

The engine components relevant to the present invention are indicated, albeit only area-wise, in FIG. 4, namely a cylinder head 34, an engine block 36, a chain case top part 38 and a chain case bottom part 40. The joints at which the cylinder head and the chain case top part or the engine block and the chain case bottom part border on one another (butt joints) are both designated 42, because in the illustrated embodiment the two joints or interfaces lie exactly above one another, and, for this reason, they are only indicated by a single dot-and-dash line in FIG. 3.

Whereas in the ideal case, which is difficult to bring about in practical terms, cylinder head and chain case top part or engine block and chain case bottom part form continuous, flat sealing surfaces, between which the cylinder head gasket is clamped, manufacturing and assembly tolerances often lead to the sealing surfaces designated 51 and 52 in FIG. 4 forming a small step at the joints 42. The step in the sealing surface 52 is, as a rule, significantly larger or higher than a step which may be present in the sealing surface 51, as assembly of the chain case top part 38 is often carried out on positioning pins and so very precisely. The sealing surface 52 in the area of the chain case bottom part 40 can lie lower than in the area of the engine block 36 by 0.2±0.2 mm, i.e., up to 0.4 mm.

The subject matter of the present invention are two essentially strand-shaped sealing elements 50 which are arranged on both sides of the chain case opening 20, more specifically, beside the narrow sides of the chain case opening, and which—in a plan view of the gasket—lie in the area of the half bead 30 or bead crest 30a. In accordance with the invention, to produce the sealing elements 50, two strands consisting of an initially pasty sealing material and corresponding in their length to the length of the sealing elements 50 are applied to the surface of the sheet metal layer 26 on the engine block side. The sealing material can be made to solidify, in particular, by heating, so that initially it has not only elastic but also plastic properties and then only elastic properties. As will be apparent from FIG. 4 in conjunction with FIGS. 1 and 3, the sheet metal layer 26 has under each sealing element 50 a window-like cutout 56 whose shape corresponds to that of an elongate hole or a rectangle, which extends in the longitudinal direction of the adjacent sealing element 50 and is preferably significantly shorter than the sealing element 50. In a preferred embodiment, the cutout 56 has the dimensions 3×5 mm.

In accordance with the invention, the height of the sealing elements 50 is several times greater (vertical dimension in accordance with FIG. 4) than the thickness of the sheet metal layer 26—in a preferred embodiment the height of the sealing elements 50 is from 0.7 to 0.9 mm.

When applying the sealing material later forming the sealing elements 50 to the sheet metal layer 26, the sealing material can enter the cutout 56, as indicated in FIG. 4. In accordance with the invention, it is only when installing the gasket and clamping the gasket between the machine component sealing surfaces that the material of the sealing elements 50 passes through the cutout 56 so it then projects over the two main surfaces of the gasket plate 10 and is pressed against the sealing surfaces 51 and 52, more specifically, precisely in the area of the joints 42. The sealing material forms on the bottom side of the gasket plate in accordance with FIG. 4 an elongate, elastomeric rib, which is pressed against the sealing surface 52, whereas owing to the slight unevennesses of the sealing surface 51 on the top side (in accordance with FIG. 4) of the gasket, a short elastomeric area of the sealing elements 50 exiting from the cutout 56 is sufficient for reliable sealing.

When manufacturing the flat gasket, it is readily possible, in order to produce the sealing elements 50, to apply strands of sealing material to the sheet metal layer 26 and, more particularly, in such a controlled way with respect to the length, width and volume of these strands as to exactly obtain the desired sealing elements 50.

For the sake of completion, mention is made of the fact that the plane of the maximum level as defined above is drawn as a dot-dash-line 100 in FIG. 2. In the illustrated embodiment this plane of the maximum level extends parallel to the plane of the gasket plate 10 as a tangential plane to the bead crest 30a of the bead 30.

What is claimed is:

1. Flat gasket for sealing a sealing gap between sealing surfaces of machine components, said sealing surfaces being pressable against said flat gasket, said flat gasket comprising a gasket plate formed by a sheet metal layer, said gasket plate being provided with at least one elastomeric sealing element in a gasket plate area serving to seal a sealing gap area in which the machine component sealing surfaces result in a locally varying sealing surface pressure at the flat gasket, said sealing element being arranged on a first main surface of the sheet metal layer, and a surface contour of the sheet metal layer defining at the second main surface of the sheet metal layer a plane of a maximum level of said surface contour parallel to the plane of the gasket plate in the unmounted, unpressed state of the flat gasket, wherein (a) the sealing element is in the form of an elongate strand-like sealing element formed from a material which is applied in the form of an elongate strand to the first main surface of the sheet metal layer and is curable in situ;

(b) the sheet metal layer is provided in the area of the sealing element with a cutout for passage of the curable sealing element material therethrough, said cutout being shorter than the sealing element in a longitudinal direction of said sealing element;

(c) the material of the sealing element is initially capable of undergoing plastic deformation at least at operating temperature of the machine components and the flat gasket such that in the mounted, pressed state of the flat gasket, the sealing element extends through the cutout of the sheet metal layer as far as the machine component sealing surface adjacent to the second main surface of the sheet metal layer;

(d) the gasket plate and the sealing element are so designed that in the unmounted, unpressed state of the flat gasket, the sealing element extends at the most as far as said plane of the maximum level.

2. Flat gasket as defined in claim 1, wherein the material of the sealing element is curable at elevated temperatures with respect to room temperature.

3. Flat gasket as defined in claim 2, wherein the material of the sealing element is not yet cured so long as the flat gasket is not yet mounted.

4. Flat gasket as defined in claim 1, the machine components being engine components including a cylinder head, an engine block, a chain case top part adjacent to the cylinder head and/or a chain case bottom part adjacent to the engine block, engine component sealing surfaces being formed by the cylinder head, the engine block and at least one of said chain case parts, and the flat gasket being designed as a cylinder head gasket with a chain case sealing area, wherein the sealing element is designed and arranged on the first main surface of the sheet metal layer so as to bridge a joint between a first one of said chain case parts and the engine component adjacent thereto.

5. Flat gasket as defined in claim 4, wherein the cutout is designed and arranged so as to bridge a joint between a second one of said chain case parts and the engine component adjacent thereto.

6. Flat gasket as defined in claim 1, wherein the cutout is designed as an elongate window lying under said strand-like sealing element.

7. Flat gasket as defined in claim 6, wherein the cutout is a slot extending in the longitudinal direction of the sealing element and being shorter than said sealing element.

8. Flat gasket as defined in claim 1, wherein the sheet metal layer is provided in the area of its cutout with a bead which forms on the second main surface of the sheet metal layer a projection rising above the cutout.

9. Flat gasket as defined in claim 8, wherein the bead is in the form of a half bead.

10. Flat gasket as defined in claim 8, wherein the bead forms a bead line closed within itself, which extends around a chain case opening of the flat gasket.

11. Flat gasket as defined in claim 8, wherein—in a plan view of the flat gasket—the crest of the bead lies over the sealing element.

* * * * *